(12) United States Patent
Meyer

(10) Patent No.: US 11,647,760 B2
(45) Date of Patent: May 16, 2023

(54) EMULSION FOR IMPROVING MEAT

(71) Applicant: Texas Tech University System, Lubbock, TX (US)

(72) Inventor: Richard Schlomer Meyer, Harrison, ID (US)

(73) Assignee: Texas Tech University System, Lubbock, TX (US)

( * ) Notice: Subject to any disclaimer, the term of this patent is extended or adjusted under 35 U.S.C. 154(b) by 0 days.

(21) Appl. No.: 16/180,816

(22) Filed: Nov. 5, 2018

(65) Prior Publication Data

US 2019/0069568 A1 Mar. 7, 2019

Related U.S. Application Data

(63) Continuation-in-part of application No. 15/555,439, filed as application No. PCT/US2016/020651 on Mar. 3, 2016, now Pat. No. 11,357,247.

(60) Provisional application No. 62/128,344, filed on Mar. 4, 2015.

(51) Int. Cl.
*A23B 4/20* (2006.01)
*A23B 4/24* (2006.01)
*A23L 13/00* (2016.01)
*A23L 13/70* (2016.01)
*A23L 29/25* (2016.01)
*A23L 3/349* (2006.01)
*A23L 27/60* (2016.01)
*A23L 29/256* (2016.01)
*A23L 13/40* (2016.01)
*A23L 15/00* (2016.01)
*A23L 13/74* (2023.01)

(52) U.S. Cl.
CPC ................ *A23B 4/20* (2013.01); *A23B 4/24* (2013.01); *A23L 3/349* (2013.01); *A23L 13/00* (2016.08); *A23L 13/03* (2016.08); *A23L 13/422* (2016.08); *A23L 13/428* (2016.08); *A23L 13/43* (2016.08); *A23L 13/74* (2016.08); *A23L 15/35* (2016.08); *A23L 27/60* (2016.08); *A23L 29/25* (2016.08); *A23L 29/256* (2016.08); *A23V 2002/00* (2013.01)

(58) Field of Classification Search
CPC ........ A23D 7/0053; A23D 7/003; A23D 9/06; A23L 29/10; A23L 25/10; A23L 23/00; A23L 27/60; A23L 27/10; A23L 21/10; A23L 27/00; A23L 27/12; A23L 3/349; A23L 13/00; A23L 13/03; A23L 13/422; A23L 13/428; A23L 13/43; A23L 13/74; A23L 15/35; A23L 29/25; A23L 29/256; A23G 1/48; A23G 1/36; A23G 1/32; A23G 1/56; C11B 5/0085; C11B 5/0035; C11B 5/0092; A23V 2002/00; A23C 11/08; A23B 4/20; A23B 4/24

USPC ......................................................... 426/601
See application file for complete search history.

(56) References Cited

U.S. PATENT DOCUMENTS

| | | |
|---|---|---|
| 1,395,934 A | 11/1921 | Stockton |
| 1,398,352 A | 11/1921 | Stockton |
| 2,944,906 A | 7/1960 | Spitzer et al. |
| 3,264,121 A * | 8/1966 | Tuomy ...................... A23L 3/44 |
| | | 426/640 |
| 3,542,565 A | 11/1970 | Stauffer et al. |
| 3,930,057 A | 12/1975 | Jokay |
| 4,105,461 A | 8/1978 | Racciato |
| 4,308,294 A | 12/1981 | Rispoli et al. |
| 4,913,921 A | 4/1990 | Schroeder et al. |
| 5,366,754 A | 11/1994 | Rudan et al. |
| 5,395,631 A | 3/1995 | Sweeney |
| 5,425,957 A | 6/1995 | Gaim-Marsoner et al. |
| 5,605,697 A | 2/1997 | Asano et al. |
| 5,958,498 A | 9/1999 | Trueck et al. |
| 6,423,363 B1 | 7/2002 | Traska et al. |
| 6,544,573 B1 | 4/2003 | Pajela et al. |
| 2005/0084471 A1 | 4/2005 | Andrews et al. |
| 2005/0244564 A1* | 11/2005 | Perlman ................... A23D 9/00 |
| | | 426/602 |
| 2006/0216391 A1 | 9/2006 | Delsol |
| 2008/0069928 A1 | 3/2008 | Moder et al. |
| 2008/0050494 A1 | 8/2008 | Meyer |

FOREIGN PATENT DOCUMENTS

| | | |
|---|---|---|
| CA | 2357861 A1 | 3/2002 |
| EP | 689773 A1 | 1/1996 |
| WO | 2014121141 A1 | 8/2014 |

OTHER PUBLICATIONS

NPL Kwan et al. (in J Food Sci 56(6), 1537-1541, 1991). (Year: 1991).*
NPL Stephanie et al. ("Oxidative and thermal stabilities of genetically modified high oleic sunflower oil" in Food Chemistry 102, 1208-1213, 2007) (Year: 2007).*
Ghosh et al. "Isolation of Tocopherol and Sterol Concentrate from Sunflower Oil Deodorizer Distillate" JAOCS vol. 73 (10) pp. 1271-127 4, 1996.
Cleveland, Brady D. et al. "Effect of Natural Antioxidant Concentration on Lipid Oxidation of Ready-to-Eat Ground Beef Links from Cattle Fed Distillers Grains in Different Phases of Production" 2014 Nebraska Beef Cattle Report, p. 109-110.

(Continued)

*Primary Examiner* — Donald R Spamer
*Assistant Examiner* — Bhaskar Mukhopadhyay
(74) *Attorney, Agent, or Firm* — Edwin S. Flores; Daniel J. Chalker; Chalker Flores, LLP

(57) ABSTRACT

The present invention includes a method and meat product made by contacting an emulsion with a meat product for a time sufficient to, wherein the emulsion comprises by weight: 10% to 50% water, 0.1 to 4.0% Quillaja, 0.1% to 8% meat flavoring, 60% to 85% high oleic sunflower oil, meat seasoning, 0-2.0% salt, and optionally one or more stabilizers.

30 Claims, 9 Drawing Sheets

(56) References Cited

OTHER PUBLICATIONS

International Search Report (PCT/US2016/020651) dated Jun. 10, 2016.

Smith, Stephanie et al. "Oxidative and thermal stabilities of genetically modified high oleic sunflower oil" Food Chemistry 102: 1208-1213, 2007.

Nikovska, Kremena "Study of olive oil-in-water emulsions with protein emulsifiers", Emir. J. Food Agric. 2012. 24 (1): 17-24.

* cited by examiner

Eggless Mayo-Heat Stable, freeze-thaw stable & all Natural

| | | Heat Stable, all natural | | Heat stable, freeze-thaw stable, all natural | | Heat stable, freeze-thaw stable, all natural | |
|---|---|---|---|---|---|---|---|
| | Figure 1 | Eggless A version | | Eggless Improved | | butter spread | |
| 1/19/2015 best | | % | batch | B | C | | batch |
| Add | Pre-blend water soluble ingredients | | 1000.00 | | | | 1000.000 |
| 1 | water, distilled, no minerals | 15.781% | 157.81 | 14.556% | 13.864% | 13.864% | 138.640 |
| 2 | TIC | Ticaloid 1155 (Gum Arabic/guar/Xanthan Gum) 0.2 to 0.4% | | 0.300% | 0.300% | 0.300% | 3.000 |
| 3 | HORN | Quillaja natural flavor | 1.000% | 10.00 | 1.000% | 1.000% | 1.000% | 10.000 |
| 4 | Heinz | white vinegar (50 grain) | 0.069% | 0.69 | 0.069% | 0.069% | 0.069% | 0.690 |
| 5 | | Lemon juice, natural strength, all natural | 0.092% | 0.92 | 0.092% | 0.092% | 0.092% | 0.920 |
| 6 | | salt | 0.825% | 8.25 | 0.825% | 0.825% | 0.825% | 8.250 |
| 7 | Ocean's flavor | sea salt # 68 | | | 0.825% | 0.825% | 0.825% | 8.250 |
| | | sugar | 1.468% | 14.68 | 1.468% | 0.000% | 0.000% | 0.000 |

*FIG. 1A*

Eggless Mayo-Heat Stable, freeze-thaw stable & all Natural

Figure 1

| | 1/19/2015 best | | Heat Stable, all natural | | Heat stable, freeze-thaw stable, all natural | | Heat stable, freeze-thaw stable, all natural | |
|---|---|---|---|---|---|---|---|---|
| | | | Eggless A version | | Eggless Improved | | butter spread | |
| | | | % | batch | B | C | | batch |
| Add | Pre-blend water soluble ingredients | | | 1000.00 | | | | 1000.000 |
| 8 | Agave Processor's | Agave Premium Syrup (South Africa), very bland, 70 brix | | | | 2.160% | 2.160% | 21.600 |
| 9 | McCormick's | mustard flour | 0.119% | 1.19 | 0.119% | 0.119% | 0.119% | 1.190 |
| 10 | PMP Fermentation | gluconic acid (50%) | 0.917% | 9.36 | 0.917% | 0.917% | 0.917% | 9.170 |
| 11 | WTI | Dry Vinegar | | | 0.100% | 0.100% | 0.100% | 1.000 |
| | Pre-blend oil, gums, flavor and antioxidants | | | | | | | 0.000 |
| 12 | Ungerer | nat. egg flavor F 14752 | 0.037% | 0.37 | 0.037% | 0.037% | 0.037% | 0.370 |
| | Cargill Clear valley | High oleic sunflower oil | 79.500% | 795.00 | 79.500% | 79.500% | | 0.000 |
| | Kemin fortium: tocopherols | MTD-10 (0.015% of oil) | 0.092% | 0.92 | 0.092% | 0.092% | 0.092% | 0.920 |
| | Kemin fortium: Rosemary & green tea extracts | RGT12 plus dry (0.2% of product) | 0.100% | 0.92 | 0.100% | 0.100% | 0.100% | 1.000 |
| 12a | www.worldgrocer.com | Clarified Butter/Ghee: (label: fresh pasteurized cream) | | | | | 79.500% | 795.000 |
| | | aerate with nitrogen to improve spreadability | 80.765% | 807.76 | 80.865% | 83.025% | 83.025% | 830.250 |

1. blend water, vinegar, lemon juice, Quillaja, dry ingredients in a Cuisinart mixer
2. Slowly add the oil to generate a smooth, creamy emulsion.

FIG. 1B

| Eggless Mayonnaise—Heat Stable & all Natural | | | Heat stable Mayonnaise (egg) | | Heat stable, Freeze-thaw stable Mayonnaise (egg) | |
|---|---|---|---|---|---|---|
| 10/5/2014 | Figure 2 | | MA | MB | MAF | MBF |
| Add | | Pre-blend water soluble ingredients | | | | |
| 1 | | water, distilled, no minerals | 11.781% | 13.781% | 11.481% | 13.481% |
| 2 | HORN | Quillaja natural flavor | 1.000% | 1.000% | 1.000% | 1.000% |
| 3 | Heinz | white vinegar (50 grain) | 0.069% | 0.069% | 0.069% | 0.069% |
| 4 | | Lemon juice, natural strength, all natural | 0.092% | 0.092% | 0.092% | 0.092% |
| 5 | TIC | Ticaloid 1155 (Gum Arabic/guar/Xanthan Gum) 0.2 to 0.4% | | 0.300% | 0.300% | 0.300% |
| 6 | | salt | 0.825% | | | |
| 6 | Ocean's flavor | sea salt # 68 | | 0.825% | 0.825% | 0.825% |
| 7 | | sugar | 1.468% | 1.468% | 1.468% | 1.468% |
| 7 | Agave Processor's: Agave Premium Syrup (South Africa), very bland | | | | | |
| 8 | McCormick's | mustard flour | 0.119% | 0.119% | 0.119% | 0.119% |
| 9 | PMP Fermentation | gluconic acid (50%) | 0.917% | 0.917% | 0.917% | 0.917% |
| | | Pre-blend oil flavor and antioxidants | | | | |
| | Ungerer | nat. egg flavor F 14752 | 0.037% | 0.037% | 0.037% | 0.037% |
| | Cargill | High oleic sunflower oil | 79.500% | 79.500% | 79.500% | 79.500% |
| 10 | Kemin fortium: mixed tocopherols | MTD-10 (0.015% of oil) | 0.092% | 0.092% | 0.092% | 0.092% |
| | Kemin fortium: Rosemary & green tea extracts | RGT12 plus dry (0.2% of product) | 0.100% | 0.100% | 0.100% | 0.100% |
| 12 | | egg yolks | 4.000% | | 4.000% | |
| 13 | | whole eggs | | 2.000% | | 2.000% |
| 14 | | Ca EDTA (75 ppm) | | | | |
| | | | 100.000% | 100.000% | 100.000% | 100.000% |

1. blend water, vinegar, lemon juice, Quillaja, dry ingredients in a Cuisinart mixer with blade operating at high speed.
2. Slowly add the oil to generate a smooth, creamy emulsion.

*FIG. 2*

| Eggless Mayo--Heat Stable & all Natural | | | | | Heat stable, freeze-thaw stable, all natural, 50% less sodium | |
|---|---|---|---|---|---|---|
| | 1/25/2015 best | Figure 3 | | | | |
| | | | C-2 | | E | |
| | | | | Batch | | Batch |
| Add | | Pre-blend water soluble ingredients | | 1000.00 | | 1000.00 |
| 1 | | water, distilled, no minerals | 13.014% | 130.140 | 13.714% | 137.14 |
| 2 | TIC | Ticaloid 1155 (Gum Arabic/guar/Xanthan Gum) 0.2 to 0.4% | 0.300% | 3.000 | 0.200% | 2.00 |
| 3 | HORN | Quillaja natural flavor | 1.000% | 10.000 | 1.000% | 10.00 |
| 4 | Heinz | white vinegar (50 grain) | 2.569% | 25.690 | 2.569% | 25.69 |
| 5 | | Lemon juice, natural strength, all natural | 0.092% | 0.920 | 0.092% | 0.92 |
| 6 | | salt | 0.625% | 6.250 | 0.325% | 3.25 |
| 7 | Ocean's flavor | sea salt # 68 | 0.625% | 6.250 | 0.325% | 3.25 |
| 8 | Agave Processor's | Agave Premium Syrup (South Africa), very bland | 2.160% | 21.600 | 2.160% | 21.60 |
| 9 | McCormick's | Mayo mustard | 0.119% | 1.190 | 0.119% | 1.19 |
| 10 | PMP Fermentation | gluconic acid (50%) | 0.717% | 7.170 | 0.717% | 7.17 |
| 11 | Kemin fortium: Rosemary & green tea extracts | RGT12 plus dry (0.2% of product) | 0.100% | 1.000 | 0.100% | 1.00 |
| 12 | WTI | Dry Vinegar | 0.050% | 0.500 | 0.050% | 0.50 |
| | | Pre-blend oil, gums, flavor and antioxidants | | | | 0.00 |
| | Ungerer | nat. egg flavor F 14752 | 0.037% | 0.370 | 0.037% | 0.37 |
| 13 | Cargill Clear valley | High oleic sunflower oil | 78.500% | 785.000 | 78.500% | 785.00 |
| | Kemin fortium: tocopherols | MTD-10 (0.015% of oil) | 0.092% | 0.920 | 0.092% | 0.92 |
| 14 | GNT Exberry | natural Shade "Celestial yellow" # 474503 | | | | |
| 15 | GNT Exberry | natural Shaded "Mango yellow" # 450005 | | | | |
| | | | 100.000% | 1000.000 | 100.000% | 1000.00 |

1. blend water, vinegar, lemon juice, Quillaja, dry ingredients in a Cuisinart mixer with blade operating at high speed.
2. Slowly add the oil to generate a smooth, creamy emulsion.

FIG. 3

| Eggless Mayo--Heat Stable & all Natural | | Heat stable, freeze-thaw stable, 50% less sodium and all natural | | Eggless Improved | |
|---|---|---|---|---|---|
| 1/25/2015 best | Figure 4 | B | Batch | C | Batch |
| Add | | | 1000.00 | | 1000.00 |
| 1 | Pre-blend water soluble ingredients | | | | |
| | water, distilled, no minerals | 15.156% | 151.560 | 14.464% | 144.640 |
| 2 | TIC | Ticaloid 1155 (Gum Arabic/guar/Xanthan Gum) 0.2 to 0.4% | 0.300% | 3.000 | 0.300% | 3.000 |
| 3 | HORN | Quillaja natural flavor | 1.000% | 10.000 | 1.000% | 10.000 |
| 4 | Heinz | white vinegar (50 grain) | 0.069% | 0.690 | 0.069% | 0.690 |
| 5 | | Lemon juice, natural strength, all natural | 0.092% | 0.920 | 0.092% | 0.920 |
| 6 | | salt | 0.625% | 6.250 | 0.625% | 6.250 |
| 7 | Ocean's flavor | sea salt # 68 | 0.625% | 6.250 | 0.625% | 6.250 |
| 8 | | sugar | 1.468% | 14.680 | 0.000% | 0.000 |
| 8 | Agave Processor's | Agave Premium Syrup (South Africa), very bland | 0.000 | 0.000 | 2.160% | 21.600 |
| 9 | McCormick's | mustard flour | 0.119% | 1.190 | 0.119% | 1.190 |
| 10 | PMP Fermentation | gluconic acid (50%) | 0.717% | 7.170 | 0.717% | 7.170 |
| 11 | WTI | Dry Vinegar | 0.100% | 1.000 | 0.100% | 1.000 |
| | | Pre-blend oil, gums, flavor and antioxidants | 0.000 | 0.000 | 0.000 | 0.000 |
| | Ungerer | nat. egg flavor F 14752 | 0.037% | 0.370 | 0.037% | 0.370 |
| | Cargill Clear valley | High oleic sunflower oil | 79.500% | 795.000 | 79.500% | 795.000 |
| 12 | Kemin fortium: tocopherols | MTD-10 (0.015% of oil); mixed tocoherols | 0.092% | 0.920 | 0.092% | 0.920 |
| | Kemin fortium: Rosemary & green tea extracts | RGT12 plus dry (0.2% of product); Rosemary extract & green tea extract | 0.100% | 1.000 | 0.100% | 1.000 |
| 13 | GNT Exberry | natural Shade "Celestial yellow" # 474503 | | | | |
| 14 | GNT Exberry | natural Shaded "Mango yellow" # 450005 | | | | |
| | | add natural colors to match the yellow tint on mayonnaise from the egg yolks | | | | |
| | | | 100.000% | 1000.000 | 100.000% | 1000.000 |

1. blend water, vinegar, lemon juice, Quillaja, dry ingredients in a Cuisinart mixer with blade operating at high speed.
2. Slowly add the oil to generate a smooth, creamy emulsion.

*FIG. 4*

| All natural, non-melting cheese and cheese sauces | | | |
|---|---|---|---|
| | solid & semisoft cheeses | cheese sauces | preferred cheese sauce |
| cheese (cheddar, Swiss, etc.) | 97.0% to 99.9% | 25% to 85% | 64.00% |
| Quillaja | 0.1 to 3.0% | 0.1 to 3.0% | 2.00% |
| cream (30% butter fat) | | 0 to 35% | 12.00% |
| unsalted butter | | 0 to 20% | 12.00% |
| water | | 0 to 35% | 10.00% |
| | | | 100.00% |

| All natural, non-melting chocolate | | |
|---|---|---|
| | | preferred |
| Quillaja | 0.1 to 3.0% | 2.00% |
| Chocolate: sugar, cacao beans, cocoa butter, lecithin, vanilla with or without milk added | 99.9% to 97% | 98.00% |

Process:
1. Cheese & sauces:
a. shredded cheese; add Quillaja; blend; heat to ~ 140 F stirring constantly until cheese has melted and blended completely. Chill to set.
2. cheese sauces:
a. shredded cheese; add Quillaja and water; blend; heat to ~ 140 F stirring constantly, then add cream and butter. Chill to set.
3. Chocolate: Blend semi-sweet chocolate chips with Quillaja; heat to 105 F to 110 F, stirring constantly until thoroughly blended. Immediately chill to 40 to 70 F to set chocolate.

FIG. 5

| All natural, non-separating nut and seed butters (peanut butter, sunflower seed butter, etc.) | | | |
|---|---|---|---|
| | % | % | batch weight |
| Quillaja ultra pure NP (0.1% to 10.00% of oil portion) | 0.000% | | 454.00 |
| Quillaja (2% of oil) | | 1.000% | 4.54 |
| Quillaja is labeled as a natural flavoring | | | 0.00 |
| Adams creamy unsalt peanut butter: | | | 0.00 |
| oil | 50.000% | 49.500% | 224.73 |
| carbohydrates | 187.750% | 18.560% | 84.26 |
| protein | 21.875% | 21.650% | 98.29 |
| water & minerals | 9.375% | 9.290% | 42.18 |
| total | 100.000% | 100.000% | 454.00 |
| Process A. Warm creamy nut butter to 120 F and blend in 1% Quillaja (based on oil) and cool to ambient temperature. | | | |
| Process B: Add 1% Quillaja (based on oil) to nuts or seeds ready to grind; blend to evenly distribute; grind and cool. | | | |

*FIG. 6*

| Heat Stable creamy, fat/oil containing Sauces | | | Example |
|---|---|---|---|
| Base | | | % |
| | | water (5.0% to 99.5%) | 38.800% |
| Desert King | Quillaja ultra Pure NP (0.1% to 10.0% of oil) typically 1% to 2% of the oil | | 1.200% |
| Desert King International, Quillaja Ultra NP, 100% pure Extract of Quillaja | | | |
| | Oil sources (0.1% to 85.0%) | High Stability Algal Oil | 60.000% |
| | | vegetable oils | |
| | | nut & seed oils | |
| | | animal sourced fats & oils | |
| | | | 100.000% |
| 1. blend water and quillaja. | | | |
| 2. VERY Slowly add the oil while blending in a high shear mixer to get an emulsion. | | | |
| 3. This stabilized creamy blend is ready to add to the target base (e.g. creamy soup, creamy sauces, creamy desserts, creamy puddings, etc. | | | |
| 4. Completed formula can be hot filled, retoned, refrigerated or frozen. | | | |

FIG. 7

| | | Seasoned Chicken (patties) | | | |
|---|---|---|---|---|---|
| supplier | | A | A | B | B |
| any | Coarse ground chicken breast, skinless, boneless | 90.00% | 600 gram batch 540.0000 | 75.00% | 600.0000 450.0000 |
| | Brine: | 6.00% | 36.0000 | 21.00% | 126.0000 |
| | Emulsion: | | | | |
| any | 30% water | | | | |
| Ingredion-Naturex | 2% Quillaja, natural flavoring | | | | |
| Cargill | 68% oil, high oleic sunflower | | | | |
| Red Arrow | 1% Fried flavor RA 09020-05 | | | | |
| | water to make pumpable? | | | | |
| | Seasoning: | | | | |
| Elite or Kerry | KFC Seasoning, no salt added | 2.00% | 12.0000 | 2.00% | 12.0000 |
| any | salt, plain (adjust for flavor) | 1.00% | 6.0000 | 1.00% | 6.0000 |
| Red Arrow | Natural Crispy Chicken flavor: FL RA 1803 | 1.00% | 6.0000 | 1.00% | 6.0000 |
| | Optional Stabilizers: | | | | |
| WendaPhos 900 or ICL Brifisol 550 | Phosphates: 0.5% | | | | |
| TIC gums | k-carrageenan: 0.1% | | | | |
| Kemin | Green tea & Rosemary extract: 0.1% | | | | |
| Kemin | mixed tocopherols: 0.05% | | | | |
| Florida Food Products or Kerry | celery powder: to 180 ppm nitrites | 100.00% | 600.0000 | 100.00% | 600.0000 |
| | The coarse ground chicken was blended with the emulsion (made separately), seasonings and flavors. The resulting mix was formed into patties and fried until fully cooked. | | Patties had a tender, slightly stiff texture, moist and great flavor. | | Patties had a softer texture and very moist, great flavor. |

FIG. 8

EMULSION FOR IMPROVING MEAT

CROSS-REFERENCE TO RELATED APPLICATIONS

This application claims priority to U.S. Provisional Application Ser. No. 62/128,344, filed Mar. 4, 2015, PCT Application No. PCT/US16/20651 filed Mar. 4, 2016, and is a Continuation-in-Part of U.S. application Ser. No. 15/555,439, filed Sep. 1, 2017, the entire contents of each of which are incorporated herein by reference.

TECHNICAL FIELD OF THE INVENTION

The present invention relates in general to the field of eggless, heat stable mayonnaise-type dressing and meat applications.

STATEMENT OF FEDERALLY FUNDED RESEARCH

Not Applicable.

BACKGROUND OF THE INVENTION

Without limiting the scope of the invention, its background is described in connection with a mayonnaise-type emulsion.

Many sauces are in the form of emulsions, which are a blend or mixture of two or more liquids that are not soluble. One issue with these types of foods is their tendency to demulsify when subjected to heat.

Mayonnaise is a well-known emulsion of oil in lemon juice that has been stabilized by the molecule lecithin found in the egg yolks. It is used as a sauce for foods and is a favored dressing for sandwiches, salads, and other prepared foods as well as an ingredient in numerous recipes for a variety of foods. It is well known that mayonnaise will demulsify when subjected to heat or freezing temperatures, causing the ingredients to separate, resulting in a gooey mess. The key to making mayonnaise is to avoid having the components of the emulsion separate back into their individual components. This is called "turned" or "broken" mayonnaise. No matter how long the oil and lemon juice are mixed together, they will always separate into a gooey mess unless the egg yolk is added as a stabilizer.

The shelf-life of mayonnaise can vary, depending on the ingredients and the conditions under which it is stored. Usually, once opened, mayonnaise needs to be refrigerated to avoid quick spoliation. Heat can cause the emulsion to break down, resulting in a separation of the ingredients, particularly the oil from the lemon juice. Refrigeration is necessary to slow down the rate of rancidity.

The Food and Drug Administration has promulgated regulations about the contents of mayonnaise at 21 C.F.R. § 169.140. With respect to the use of eggs, the regulation provides in subsection (c) "(c) Egg yolk-containing ingredients. Liquid egg yolks, frozen egg yolks, dried egg yolks, liquid whole eggs, frozen whole eggs, dried whole eggs, or any one or more of the foregoing ingredients listed in this paragraph with liquid egg white or frozen egg white."

Because of concerns about cholesterol, and to accommodate vegan diets, an egg-free type of dressing has been developed with a taste similar to mayonnaise. A popular substitute for the eggs is Soy Protein isolate. Because the eggs are omitted from the ingredients, the dressing can no longer be called "mayonnaise" under the federal regulations. However, FDA now allows eggless mayonnaise to be called "Mayo".

Many meat product being with poor texture, organoleptic characteristics, and can give a heavy feeling after consumption. What are needed are better methods and compositions for processing meats that improve, noticeably, the organoleptic characteristics of meat and meat products.

SUMMARY OF THE INVENTION

In one embodiment, the present invention includes a method for preserving a meat product comprising: contacting an emulsion with a meat product for a time sufficient to, wherein the emulsion comprises by weight: 10% to 50% water, 0.1 to 4.0% Quillaja, 0.1% to 8% meat flavoring, 60% to 85% high oleic sunflower oil, meat seasoning, 0-2.0% salt, and optionally one or more stabilizers. In one aspect, the method further comprises adding 0.01% to 0.3% RGT 12 Plus Dry, 0.01% to 1.0% by weight of a gum or gum blend including one or more natural gums selected from the group consisting of gum Arabic, guar and Xanthan gum. In another aspect, the gum blend comprises 50% gum Arabic, 30% guar gum and 20% Xanthan gum. In one aspect, the emulsion is defined further as comprising, by weight, 11.00-14.00% water, 1.0% Quillaja, 0.07% white vinegar, 0.09-0.10% lemon juice, 0.80-0.90% salt, 1.40-1.50% sugar, 0.10-0.12% mustard flour, 0.90-1.00% gluconic acid; and a pre-blend comprising: 0.03-0.04% natural egg flavor, 79.0-80.0% high oleic sunflower oil, 0.09-0.10% tocopherols (diluted to 0.015% in oil), 0.10% blend of rosemary and green tea extracts, and 2% to 4% eggs; and 0.1% to 0.3% CaEDTA. In one aspect, the preservatives are selected from at least one of: phosphates, k-carrageenan, green tea extract, rosemary extract, mixed tocopherols, or celery powder, to 180 ppm nitrites. In one aspect, the emulsion is defined further as comprising, by weight, 11.781% to 13.781% water, 1.0% Quillaja, 0.069% white vinegar, 0.092% lemon juice, 0.825% salt, 1.468% sugar, 0.119% mustard flour, 0.917% gluconic acid; and a pre-blend comprising: 0.037% natural egg flavor, 79.5% high oleic sunflower oil, 0.092% MTD-10, 0.1% RGT12 Plus Dry, 2% to 4% eggs; and 0.1% to 0.3% CaEDTA. In one aspect, the emulsion is defined further as comprising, wherein the eggs comprise one of 4% whole eggs or 2.0% egg yolks or further comprising, by weight, 0.01% to 1.0% of a gum or gum blend including one or more natural gums selected from the group consisting of gum Arabic, guar and Xanthan gum In one aspect, the emulsion is defined further as comprising, wherein the eggs comprise one of 4% whole eggs or 2.0% egg yolks or further comprising, by weight, 0.01% to 1.0% of a gum or gum blend including one or more natural gums selected from the group consisting of gum Arabic, guar and Xanthan gum. In one aspect, the gum blend includes by weight 50% gum Arabic, 30% guar gum and 20% Xanthan gum. In another aspect, the meat is contacted with the emulsion for at least 1 to 90 minutes at room temperature. In another aspect, the meat is selected from beef, veal, buffalo, lamb, goat, chicken, pork, emu, ostrich, game hen, squab, guinea fowl, turkey, pheasant, quail, duck, or goose. In another aspect, the method further comprises the step of chemical tenderizing selected from the group consisting of aging in the composition, acids, spices, enzymes, and combinations thereof. In another aspect, the method further comprises the step of mechanical tenderizing selected from the group consisting of pounding, needle tenderizing, injecting, grinding, and combinations thereof. In another aspect, the emulsion is a concentrate emulsion. In another aspect, the emulsion is a ready-to-use emulsion. In another aspect, the meat is a whole animal, leg, thigh, breast, ribs, flank, loin, sausages, processed meat products, jerky, or other cut of meat, processed or ground meat.

In another embodiment, the present invention includes a meat product having improved organoleptic characteristics made by a method comprising: contacting an emulsion with a meat product for a time sufficient to, wherein the emulsion comprises by weight: 10% to 50% water, 0.1 to 4.0% Quillaja, 0.1% to 8% meat flavoring, 60% to 85% high oleic sunflower oil, meat seasoning, 0-2.0% salt, and optionally one or more stabilizers. In one aspect, the method further comprises adding 0.01% to 0.3% RGT 12 Plus Dry, 0.01% to 1.0% by weight of a gum or gum blend including one or more natural gums selected from the group consisting of gum Arabic, guar and Xanthan gum. In another aspect, the gum blend comprises 50% gum Arabic, 30% guar gum and 20% Xanthan gum. In one aspect, the emulsion is defined further as comprising, by weight, 11.00-14.00% water, 1.0% Quillaja, 0.07% white vinegar, 0.09-0.10% lemon juice, 0.80-0.90% salt, 1.40-1.50% sugar, 0.10-0.12% mustard flour, 0.90-1.00% gluconic acid; and a pre-blend comprising: 0.03-0.04% natural egg flavor, 79.0-80.0% high oleic sunflower oil, 0.09-0.10% tocopherols (diluted to 0.015% in oil), 0.10% blend of rosemary and green tea extracts, and 2% to 4% eggs; and 0.1% to 0.3% CaEDTA. In one aspect, the preservatives are selected from at least one of: phosphates, k-carrageenan, green tea extract, rosemary extract, mixed tocopherols, or celery powder, to 180 ppm nitrites. In one aspect, the emulsion is defined further as comprising, by weight, 11.781% to 13.781% water, 1.0% Quillaja, 0.069% white vinegar, 0.092% lemon juice, 0.825% salt, 1.468% sugar, 0.119% mustard flour, 0.917% gluconic acid; and a pre-blend comprising: 0.037% natural egg flavor, 79.5% high oleic sunflower oil, 0.092% MTD-10, 0.1% RGT 12 Plus Dry, 2% to 4% eggs; and 0.1% to 0.3% CaEDTA. In one aspect, the emulsion is defined further as comprising, wherein the eggs comprise one of 4% whole eggs or 2.0% egg yolks or further comprising, by weight, 0.01% to 1.0% of a gum or gum blend including one or more natural gums selected from the group consisting of gum Arabic, guar and Xanthan gum In one aspect, the emulsion is defined further as comprising, wherein the eggs comprise one of 4% whole eggs or 2.0% egg yolks or further comprising, by weight, 0.01% to 1.0% of a gum or gum blend including one or more natural gums selected from the group consisting of gum Arabic, guar and Xanthan gum. In one aspect, the gum blend includes by weight 50% gum Arabic, 30% guar gum and 20% Xanthan gum. In another aspect, the meat is contacted with the emulsion for at least 1 to 90 minutes at room temperature. In another aspect, the meat is selected from beef, veal, buffalo, lamb, goat, chicken, pork, emu, ostrich, game hen, squab, guinea fowl, turkey, pheasant, quail, duck, or goose. In another aspect, the meat is chemically tenderized by aging in the composition, acids, spices, enzymes, and combinations thereof. In another aspect, the meat is mechanically tenderized by pounding, needle tenderizing, injecting, grinding, and combinations thereof. In another aspect, the emulsion is a concentrate emulsion. In another aspect, the emulsion is a ready-to-use emulsion. In another aspect, the meat is a whole animal, leg, thigh, breast, ribs, flank, loin, sausages, processed meat products, jerky, or other cut of meat, processed or ground meat.

BRIEF DESCRIPTION OF THE DRAWINGS

For a more complete understanding of the features and advantages of the present invention, reference is now made to the detailed description of the invention along with the accompanying figures and in which:

FIGS. 1A and 1B represent a table for four eggless mayo compositions and a butter spread composition;

FIG. 2 is a table of four mayonnaise compositions that are heat stable and all natural, and that are heat stable as well as freeze-thaw stable;

FIG. 3 is a table of two eggless mayo compositions that are an alternative to the compositions of FIGS. 1A-1B;

FIG. 4 is a table of two compositions of heat stable and all natural eggless mayo that achieve a 50% reduction in sodium;

FIG. 5 is a table for all-natural, non-melting cheese, cheese sauces, and all-natural, non-melting chocolate;

FIG. 6 is a table for all-natural, non-separating nut and seed butters; and

FIG. 7 is a table for heat stable cream, fat or oil containing sauces.

FIG. 8 is a table that shows the improved organoleptic characteristics of a meat product using the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

The present invention includes the emulsion and its use in a process to tenderize meat, stabilize meat texture, and preserve color in meat and meat products.

As used herein, the term "organoleptic" refers to a sensation in the mouth of an individual, e.g., lightness, flavoring, texture, etc. In certain aspects, an improved organoleptic formulation or composition is one in which an individual experiences via the senses—including taste, sight, smell, and touch.

As used herein, the meat can be any meat that is suitable for human or animal consumption, including but not limited to beef, veal, buffalo, lamb, goat, chicken, pork, emu, ostrich, game hen, squab, guinea fowl, turkey, pheasant, quail, duck, or goose. The meat can be an animal or any part of an animal, including but not limited to: a whole animal, leg, thigh, breast, ribs, flank, loin, or other cut of meat, processed or ground meat.

An all-natural mayonnaise is provided that includes 10% to 25% water, 0.1% to 8% natural or Quillaja flavoring, 0.01% to 12% white vinegar, 0.05% to 12% lemon juice, 0.1% to 20% gluconic acid, 0.1% to 2.5% salt, 0.1% to 5% sugar, and 0.05% to 2.0% mustard flour. The composition further includes a pre-blend of 0.01% to 1.0% natural egg flavor F 14752, 60% to 85% high oleic sunflower oil, 0.01% to 0.3% RGT 12 Plus Dry. The water, Quillaja, and dry ingredients are blended in a high shear mixer. The pre-blended oil ingredients are then added very slowly, preferably at a high blending speed, to obtain the emulsion.

It is to be understood throughout this description that while high oleic sunflower oil is preferred, any oil of plant or animal origin can be used. The most used oils in mayonnaise are soybean oil, canola oil, safflower oil, peanut oil, corn oil, olive oil, but there are many others (avocado, algae) that can be used in the compositions of the present disclosure. More particularly, the oils fall into several classes: vegetable (canola, soybean, corn, avocado, etc.), nuts (peanut, coconut, walnut, almond, hazelnut, etc.), seeds (pumpkin, sunflower, cottonseed, sesame seed, etc.), animal (butterfat, lard, tallow, etc.), algal oil, and fish oils.

It is to be further understood that the sugar can be substituted with any sweetener like agave nectar, which is described further herein, as well as honey, high fructose corn syrup, and fruit concentrates.

In one non-limiting example, the natural flavoring is Quillaja, which is approved by the FDA for human consumption. It is available from Desert King International located in San Diego, Calif., USA.

Referring next to FIGS. 1A-1B, shown therein is a table for both an all-natural mayonnaise with an added extract and for an all-natural eggless mayo formed in accordance with the present disclosure. Also the products disclosed herein can be made with one or a variety of acidulants. Besides vinegar or acetic acid, one could use gluconic acid, lemon juice, citric acid, as well as lactic acid or malic acid.

Referring to column A, eggless version, a heat stable formulation or composition is provided to include water that is distilled, having no minerals, at 15.781%; Quillaja natural flavor at 1.0%; white vinegar (50 grain) at 0.069%; lemon juice, natural strength, and all natural 0.092%; salt at 0.825%; sugar at 1.468%; mustard flour at 0.119%; gluconic acid (50%) at 0.917%; and a pre-blend of oil, gums, flavor and antioxidants that include natural egg flavor F14752 at 0.037%; high oleic sunflower oil at 79.5%; MTD-10 (0.015% of oil) at 0.092%; and RGT12 Plus Dry (0.2% of product) at 0.10%. Ideally this is aerated with nitrogen to improve spreadability. The water, Quillaja, and dry ingredients are blended in a high shear mixer. The pre-blended oil ingredients are then added very slowly to obtain the emulsion.

This eggless version can be improved as shown in column B to remain all natural and be heat stable and freeze-thaw stable using the following composition: water that is distilled, having no minerals, at 14.556%; Ticaloid 1155 (gum Arabic/guar/Xanthan Gum 0.2% to 0.4%) at 0.300%; Quillaja natural flavor at 1.0%; white vinegar (50 grain) at 0.069%; lemon juice, natural strength, and all natural 0.092%; salt at 0.825%; sea salt #68 at 0.825%; sugar at 1.468%; mustard flour at 0.119%; gluconic acid (50%) at 0.917%; dry vinegar and a pre-blend of oil, gums, flavor and antioxidants that include natural egg flavor F14752 at 0.037%; high oleic sunflower oil at 79.5%; MTD-10 (0.015% of oil) at 0.092%; and RGT12 Plus Dry (0.2% of product) at 0.10%. Ideally this is aerated with nitrogen to improve spreadability. The water, Quillaja, and dry ingredients are blended in a high shear mixer. The pre-blended oil ingredients are then added very slowly, preferably at a high blending speed, to obtain the emulsion.

Column C shows a further composition for improved eggless mayo in which the foregoing composition of column B is altered by reducing the water to 13.864%, removing the sugar, and using Agave Premium Syrup (South Africa), very bland—70 Brix, at 2.160%.

The last two columns of FIGS. 1A and 1B are labeled "butter spread," and include ingredients very similar to column C except the high oleic sunflower oil is replaced with clarified butter/ghee (fresh pasteurized cream) at 79.5%.

Turning next to FIG. 2, for an all-natural mayonnaise that is heat stable, the compositions in columns MA and MB are provided. In columns MA and MB are found a heat stable Mayonnaise (egg) that has the following ingredients: 11.781% to 13.781% water that is distilled (no minerals), respectively, 1.0% Quillaja, 0.069% white vinegar (50 grain), 0.092% lemon juice, 0.825% salt, 1.468% sugar, 0.119% mustard flour, and 0.917% gluconic acid. A pre-blend of oil flavor and natural anti-oxidants is also provided that includes 0.037% natural egg flavor (F 14752), 79.5% high oleic sunflower oil, 0.092% MTD-10 (0.015% of oil), 0.1% RGT12 Plus Dry (0.2% of product). Column MA includes 4.0% whole eggs and 0.007% Ca EDTA (75 ppm). Alternatively, 2.0% egg yolks can be substituted for the whole eggs as shown in column MB. The process includes blending the water, Quillaja, and dry ingredients in a mixer (such as a CUISINART®). mixer with blade operating at high speed). The oil is added very slowly to obtain the emulsion. This blend is run at high speed to make the emulsion smooth.

An eggless mayo can be provided by changing the water to 15.781% and eliminating the eggs and the 0.007% CaEDTA, similar to the "Eggless A version" of FIG. 1A.

The mayonnaise composition above can be made to take a freeze-thaw without turning to liquid by adding a combination of these natural gums as shown in columns MAF and MBF in FIG. 2. In particular, gum arabic, guar and xanthan gum are added to achieve a freeze-thaw stable product that holds its texture. When added, it adds a slight amount of viscosity. Preferably this is added at 0.3% of the blend: 50% gum arabic, 30% guar gum and 20% xanthan gum. The range can be 0.01% to 1.0% and more preferably 0.2% to 0.4%. In column MAF the water is at 11.481% and whole eggs are used. In column MBF the water is 13.481% and egg yolks at 2.0% are used.

FIG. 3 illustrates an all-natural eggless mayo that is heat stable, which is an alternative to the compositions of FIGS. 1A-1B. In column C-2, the ingredients include water that is distilled, having no minerals, at 13.014%; Ticaloid 1155 (gum Arabic/guar/Xanthan Gum 0.2% to 0.4%) at 0.300%; Quillaja natural flavor at 1.0%; white vinegar (50 grain) at 2.569%; lemon juice, natural strength, and all natural 0.092%; salt at 0.625%; sea salt #68 at 0.625%; Agave Premium Syrup (South African), very bland at 2.160%; mustard flour at 0.119%; gluconic acid (50%) at 0.717%; RGT12 Plus Dry (0.2% of product) at 0.10%; dry vinegar at 0.050%; and a pre-blend of oil, gums, flavor and antioxidants that include natural egg flavor F14752 at 0.037%; high oleic sunflower oil at 78.5%; and MTD-10 (0.015% of oil) at 0.092%. This is processed by blending water, vinegar, lemon juice, Quillaja, dry ingredients in a CUISINART® mixer with blade operating at a high speed, then slowly adding the oil to generate a smooth, creamy emulsion.

Batch E is a lower salt version of column C-2 in which the water is 13.714%, the Ticaloid is at 0.200%, the salt is at 0.325%, and the sea salt is at 0.325%.

FIG. 4 is an improved eggless mayo that is all natural and heat stable. Here, the ingredients are water that is distilled, having no minerals, at 15.156%; Ticaloid 1155 (gum Arabic/guar/Xanthan Gum 0.2% to 0.4%) at 0.300%; Quillaja natural flavor at 1.0%; white vinegar (50 grain) at 0.069%; lemon juice, natural strength, and all natural 0.092%; salt at 0.625%; sea salt #68 at 0.625%; sugar at 1.468%; mustard flour at 0.119%; gluconic acid (50%) at 0.717%; dry vinegar at 0.100%; and a pre-blend of oil, gums, flavor and antioxidants that include natural egg flavor F14752 at 0.037%; high oleic sunflower oil at 79.5%; MTD-10 (0.015% of oil) at 0.092%; and RGT12 Plus Dry (0.2% of product) at 0.10%. This is processed by blending water, vinegar, lemon juice, Quillaja, dry ingredients in a CUISINART® mixer with blade operating at a high speed, then slowly adding the oil to generate a smooth, creamy emulsion.

Column C is similar to column B except the water is reduced to 14.464%, and Agave Premium Syrup at 2.160% is used instead of the sugar. The compositions in FIG. 4 achieve a heat stable, freeze-thaw stable all-natural product with a sodium reduction of 50%.

Turning next to FIG. 5, shown therein is a table for an all-natural, non-melting cheese (solid or semi-soft) that includes 97.0% to 99.9% cheese, such as cheddar, Swiss, American, and 0.1% to 3.0% Quillaja. The process involves shredding the cheese, adding the Quillaja, blending, and then heating to about 140 degrees F. while stirring occasionally until cheese has melted and blended completely, then chill to set.

FIG. 5 also shows a cheese sauce that includes 25% to 85% with a preferred amount at 64% of cheese, 0.1% to 3.0% and preferably 2.0% of Quillaja, 0% to 35% and preferably 12% cream (30% butter fat), 0% to 20% and preferably 12% unsalted butter, and 0% to 35%, and preferably 10.0% water. The cheese is shredded and Quillaja added with water and blended. The blend is heated to about 140 degrees F., while stirring constantly, and then add cream and butter. Chill to set. FIG. 5 shows the ingredients and process for an all-natural, non-melting chocolate that includes 0.1% to 3.0% and preferably 2.0% Quillaja, and 99.9% to 97% and preferably 98% collocate, such as sugar, cacao beans, cocoa butter, lecithin, vanilla with or without added milk. The process includes blending semi-sweet chocolate chips with Quillaja, heating to 105 degrees F., to 110 degrees F., while stirring constantly until thoroughly blended. Immediately chill to 40 degrees F., to 70 degrees F., to set the chocolate.

Turning next to FIG. 6, an all-natural, non-separating nut butter is provided that includes 1% by weight of Quillaja, and nut butter that includes 49.5% oil, 18.56% carbohydrates, 21.65% protein, and 9.29% water and minerals. The nut butter is heated to 120 degrees F., and the Quillaja is blended in, and then allowed to cool to ambient temperature. Alternatively, the Quillaja (based on oil) is added to nuts or seeds that are ready to grind, and then these are blended to evenly distribute, then ground and cooled.

FIG. 7 is table for a heat stable creamy, fat or oil containing sauce that includes 38.8% water, 1.2% Quillaja, and 60% oil such as high stability Algal oil, vegetable oils, nut and seed oils, and animal sourced fat and oils. The water and Quillaja is blended, and then the oil is slowly added while blending in a high shear mixer to obtain an emulsion. This stabilized creamy blend is ready to add to a target base, such as a creamy soup, creamy sauce, creamy dessert, creamy pudding, and the like. The completed formula can be hot filled, retorted, refrigerated or frozen.

Quillaja can be used to make natural oil soluble flavors, oil soluble spices extracts (essentials oils and oleoresins), water soluble for easy dispersion and making these flavor additions all natural. These flavors are now being made water soluble using polysorbate 80. Quillaja use level is 0.1% to 50.0% because the FDA limits emulsifier use in these formulas to 50%. The levels for a natural oil flavor extract, natural spice extract (essential oils, oleoresins) are: 99.9% to 50.00%.

FIG. 8 is a table that demonstrates the improved organoleptic characteristics of a processed meat food using the present invention. Briefly, meat patties, in this case chicken, were made using the process and compositions of the present invention and compared to other methods. This process is applicable to any type of meat or meat product, from full size animals, to animal parts, to processed animal meat, strips, breasts, ribs, loins, thighs, wings, flank, etc., and can even find particular uses in strips and/or jerky. The emulsion was used at two different levels to see what the impact the amounts would have on texture and to make sure that the higher oil level was properly held. Surprisingly, there was a noticeable texture difference with different emulsion levels (higher emulsion, softer texture, and lower cost). As such, the amounts can be adjusted to produce progressively softer jerky and strips. The emulsion was very stable and both versions tasted great.

The present invention can also be used with meat jerky to make crispy meat chips with a base in, e.g., a fried chicken flavor, a pepperoni flavor, bacon flavor, spicy flavor, jerk flavor, pepper flavor, etc. For this, a fine emulsion is made with, e.g., the chicken flavor, and the emulsion added (just like a hot dog), then thin slice and dry (either air dry or microwave vacuum dry). By comparison, if a hot dog were prepared without the stabilized emulsion of the present invention, the final product would have a greasy surface and flinty textured chip. By contrast, using the stabilized emulsion of the present invention, a final product resembling a potato chip that is light in texture with the oil captured within the protein matrix is obtained.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. A method for stably preserving a meat product consisting of:
    contacting an emulsion with a meat for a time sufficient to render the meat product heat-stable, wherein the emulsion consists essentially of, by weight: 10% to 50% water, 0.1 to 4.0% Quillaja, 0.1% to 8% meat flavoring, 60% to 85% high oleic sunflower oil, meat seasoning, 0-2.0% salt, one or more stabilizers, a gum blend, and optionally one or more preservatives,
    wherein the gum blend consists essentially of, by weight, 50% gum Arabic, 30% guar gum and 20% Xanthan gum,
    wherein both the meat product and the emulsion are freeze-thaw and heat stable product.

2. The method of claim 1, wherein the emulsion further consists essentially of adding 0.01% to 0.3% Rosemary and Green Tea Extract.

3. The method of claim 1, wherein the gum blend is 0.01% to 1.0% by weight of the emulsion.

4. The method of claim 1, wherein the emulsion is defined further as consisting essentially of, by weight, 11.00-14.00% water, 1.0% Quillaja, 0.07% white vinegar, 0.09-0.10% lemon juice, 0.80-0.90% salt, 1.40-1.50% sugar, 0.10-0.12% mustard flour, 0.90-1.00% gluconic acid; and a pre-blend consisting essentially of: 0.03-0.04% natural egg flavor, 79.0-80.0% high oleic sunflower oil, 0.09-0.10% tocopherols (diluted to 0.015% in oil), 0.10% blend of rosemary and green tea extracts, and 2% to 4% eggs, the gum blend is 0.01% to 1.0% by weight, and 0.1% to 0.3% CaEDTA.

5. The method of claim 1, wherein the one or more preservatives are selected from at least one of: phosphates, k-carrageenan, green tea extract, rosemary extract, mixed tocopherols, or celery powder, or up to 180 ppm nitrites.

6. The method of claim 1, wherein the emulsion is defined further as consisting essentially of, by weight, 11.781% to 13.781% water, 1.0% Quillaja, 0.069% white vinegar, 0.092% lemon juice, 0.825% salt, 1.468% sugar, 0.119% mustard flour, 0.917% gluconic acid; and a pre-blend consisting essentially of: 0.037% natural egg flavor, 79.5% high oleic sunflower oil, 0.092% antioxidant, 0.1% Rosemary and Green Tea Extract, 2% to 4% eggs, the gum blend is 0.01% to 1.0% by weight, and 0.1% to 0.3% Ca EDTA.

7. The method of claim 4, wherein the emulsion is defined further as consisting essentially of, one of 4% by weight whole eggs or 2.0% by weight egg yolks.

8. The method of claim 5, wherein the emulsion is defined further as consisting essentially of one of 4% by weight whole eggs or 2.0% by weight egg yolks.

9. The method of claim 1, wherein the meat is contacted with the emulsion for at least 1 to 90 minutes at room temperature.

10. The method of claim 1, wherein the meat is selected from beef, veal, buffalo, lamb, goat, chicken, pork, emu, ostrich, game hen, squab, guinea fowl, turkey, pheasant, quail, duck, or goose.

11. The method of claim 1, wherein the meat is chemically tenderized, wherein the chemical tenderizing selected from the group consisting of aging in the composition, acids, spices, enzymes, and combinations thereof.

12. The method of claim 1, wherein the meat is mechanically tenderized,
wherein the mechanical tenderizing selected from the group consisting of pounding, needle tenderizing, injecting, grinding, and combinations thereof.

13. The method of claim 1, wherein the emulsion is a concentrate.

14. The method of claim 1, wherein the emulsion is a ready-to-use emulsion.

15. The method of claim 1, wherein the meat is a whole animal, leg, thigh, breast, ribs, flank, loin, sausages, processed meat products, jerky, or other cut of meat, processed or ground meat.

16. A stable meat product having improved organoleptic characteristics made by a method consisting of:
contacting an emulsion with a meat, wherein the emulsion consists essentially of, by weight: 10% to 50% water, 0.1 to 4.0% Quillaja, 0.1% to 8% meat flavoring, 60% to 85% high oleic sunflower oil, meat seasoning, 0-2.0% salt, one or more stabilizers, a gum blend, and optionally one or more preservatives,
wherein the gum blend, consisting essentially of, by weight, 50% gum Arabic, 30% guar gum and 20% Xanthan gum,
wherein both the meat product and the emulsion are freeze-thaw and heat stable product.

17. The meat product of claim 16, wherein the emulsion further consists essentially of 0.01% to 0.3% Rosemary and Green Tea Extract.

18. The meat product of claim 16, wherein the gum blend is 0.01% to 1.0% by weight.

19. The meat product of claim 16, wherein the emulsion consists essentially of, by weight, 11.00-14.00% water, 1.0% Quillaja, 0.07% white vinegar, 0.09-0.10% lemon juice, 0.80-0.90% salt, 1.40-1.50% sugar, 0.10-0.12% mustard flour, 0.90-1.00% gluconic acid; and a pre-blend consisting essentially of: 0.03-0.04% natural egg flavor, 79.0-80.0% high oleic sunflower oil, 0.09-0.10% tocopherols (diluted to 0.015% in oil), 0.10% blend of rosemary and green tea extracts, and 2% to 4% eggs, the gum blend is 0.01% to 1.0% by weight, and 0.1% to 0.3% CaEDTA.

20. The meat product of claim 16, wherein the emulsion further consists essentially of one or more preservatives are selected from at least one of: phosphates, k-carrageenan, green tea extract, rosemary extract, mixed tocopherols, or celery powder, or up to 180 ppm nitrites.

21. The meat product of claim 16, wherein the emulsion is defined further as consists essentially of, by weight, 11.781% to 13.781% water, 1.0% Quillaja, 0.069% white vinegar, 0.092% lemon juice, 0.825% salt, 1.468% sugar, 0.119% mustard flour, 0.917% gluconic acid; and a pre-blend consisting essentially of: 0.037% natural egg flavor, 79.5% high oleic sunflower oil, 0.092% antioxidant, 0.1% Rosemary and Green Tea Extract, 2% to 4% eggs, the gum blend is 0.01% to 1.0% by weight, and 0.1% to 0.3% CaEDTA.

22. The meat product of claim 19, wherein the emulsion is defined further as consists essentially of one of 4% by weight whole eggs or 2.0% by weight egg yolks, by weight, 0.01% to 1.0% of the gum blend.

23. The meat product of claim 20, wherein the emulsion is defined further as consisting essentially of one of 4% by weight whole eggs or 2.0% by weight egg yolks, by weight, 0.01% to 1.0% of the gum blend.

24. The meat product of claim 16, wherein the meat is contacted with the emulsion for at least 1 to 90 minutes at room temperature.

25. The meat product of claim 16, wherein the meat is selected from beef, veal, buffalo, lamb, goat, chicken, pork, emu, ostrich, game hen, squab, guinea fowl, turkey, pheasant, quail, duck, or goose.

26. The meat product of claim 16, wherein the meat is chemically tenderized by aging in the composition, acids, spices, enzymes, and combinations thereof.

27. The meat product of claim 16, wherein the meat is mechanically tenderized by pounding, needle tenderizing, injecting, grinding, and combinations thereof.

28. The meat product of claim 16, wherein the emulsion is a concentrate.

29. The meat product of claim 16, wherein the emulsion is a ready-to-use emulsion.

30. The meat product of claim 16, wherein the meat is a whole animal, leg, thigh, breast, ribs, flank, loin, sausages, processed meat products, jerky, or other cut of meat, processed or ground meat.

* * * * *